United States Patent
Park

(10) Patent No.: US 9,316,875 B2
(45) Date of Patent: Apr. 19, 2016

(54) ARRAY SUBSTRATE FOR FRINGE FIELD SWITCHING MODE LIQUID CRYSTAL DISPLAY DEVICE AND METHOD FOR FABRICATING THE SAME

(71) Applicant: LG Display Co., Ltd., Seoul (KR)

(72) Inventor: MunGi Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 102 days.

(21) Appl. No.: 14/134,058

(22) Filed: Dec. 19, 2013

(65) Prior Publication Data

US 2014/0176894 A1      Jun. 26, 2014

(30) Foreign Application Priority Data

Dec. 26, 2012    (KR) .................. 10-2012-0153658

(51) Int. Cl.
*G02F 1/1343* (2006.01)
*G02F 1/1362* (2006.01)

(52) U.S. Cl.
CPC .... *G02F 1/134363* (2013.01); *G02F 1/136227* (2013.01); *G02F 2001/134372* (2013.01); *G02F 2001/136231* (2013.01); *G02F 2201/40* (2013.01)

(58) Field of Classification Search
CPC ................................................ G02F 1/134363
See application file for complete search history.

(56) References Cited

U.S. PATENT DOCUMENTS

| | | | | |
|---|---|---|---|---|
| 5,907,379 | A | * 5/1999 | Kim et al. | 349/141 |
| 2005/0078259 | A1 | * 4/2005 | Ahn et al. | 349/141 |
| 2005/0168667 | A1 | 8/2005 | Kawasaki et al. | |
| 2006/0138417 | A1 | 6/2006 | Ahn et al. | |
| 2007/0109455 | A1 | 5/2007 | Kim et al. | |
| 2008/0042133 | A1 | 2/2008 | Chin et al. | |
| 2008/0158457 | A1 | 7/2008 | Park et al. | |
| 2009/0059110 | A1 | 3/2009 | Sasaki et al. | |
| 2012/0081642 | A1 | 4/2012 | Park | |
| 2012/0113376 | A1 | 5/2012 | Hayashi et al. | |
| 2012/0169985 | A1 | 7/2012 | Kim et al. | |

FOREIGN PATENT DOCUMENTS

| | | | |
|---|---|---|---|
| CN | 1648749 | A | 8/2005 |
| CN | 1794077 | A | 6/2006 |
| CN | 101211084 | A | 7/2008 |

(Continued)

OTHER PUBLICATIONS

Japanese Office Action dated Aug. 26, 2014, for Japanese Application No. 2013-259198.

(Continued)

*Primary Examiner* — Timothy L Rude
(74) *Attorney, Agent, or Firm* — Morgan, Lewis & Bockius LLP

(57) ABSTRACT

The present disclosure relates to an array substrate for a fringe field switching mode liquid crystal display device, and a fabricating method thereof, the array substrate including a gate line on an insulating substrate, an active layer on a gate electrode, a data line having a source electrode on one side of the active layer, the data line defining a pixel region, a large pixel electrode on another side of the active layer, a planarization layer on the data line and the source electrode, a passivation layer formed on the insulating substrate, and a common electrode on the passivation layer, and overlapping the pixel electrode and the data line.

9 Claims, 9 Drawing Sheets

(56) References Cited

FOREIGN PATENT DOCUMENTS

| CN | 102446913 A | 5/2012 |
| CN | 102540596 A | 7/2012 |
| JP | 2008-015510 A | 1/2008 |
| JP | 2008-165230 A | 7/2008 |
| JP | 2009-058913 A | 3/2009 |
| JP | 2010210811 A | 9/2010 |
| JP | 2012-080102 A | 4/2012 |
| JP | 2012-099721 A | 5/2012 |
| JP | 2012-141579 A | 7/2012 |

OTHER PUBLICATIONS

The First Office Action dated Dec. 22, 2015 from the State Intellectual Property Office of the People's Republic of China in counterpart Chinese application No. 201310697581.4.
Office Action dated Dec. 16, 2015 from the Japanese Patent Office in counterpart Japanese application No. 2013-259198.

* cited by examiner

ARRAY SUBSTRATE FOR FRINGE FIELD SWITCHING MODE LIQUID CRYSTAL DISPLAY DEVICE AND METHOD FOR FABRICATING THE SAME

CROSS-REFERENCE TO RELATED APPLICATION

Pursuant to 35 U.S.C. §119(a), this application claims the benefit of earlier filing date and right of priority to Korean Application No. 10-2012-0153658, filed on Dec. 26, 2012, the contents of which is incorporated by reference herein in its entirety.

BACKGROUND OF THE DISCLOSURE

1. Field of the Disclosure

This specification relates to a liquid crystal display (LCD) device, and particularly, to an array substrate for a fringe field switching (FFS) mode LCD device and a method for fabricating the same.

2. Background of the Disclosure

In general, liquid crystal display (LCD) devices utilize properties of liquid crystals, such as optical anisotropy and polarity. Since the liquid crystal molecules have a long thin structure and an alignment orientation, the alignment of the liquid crystal molecules can be controlled by artificial application of an electric field to the liquid crystals.

Accordingly, when the alignment orientation of the liquid crystal molecules is randomly adjusted, light is refracted toward the alignment orientation of the liquid crystal molecules due to the optical anisotropy, thereby displaying image information.

Currently, active matrix liquid crystal display (AM-LCD) devices, which have thin film transistors and pixel electrodes arranged in a matrix configuration, are being developed to have high resolution and an ability to display moving images.

The LCD device includes a color filter substrate (i.e., upper substrate) having common electrodes, an array substrate (i.e., lower substrate) having pixel electrodes, and a liquid crystal interposed between the upper and lower substrates.

The common electrode and the pixel electrodes of the LCD device drive the liquid crystal molecules by an electric field formed in an up-and-down direction. Accordingly, the LCD device has high transmittance and large aperture ratio. But the LCD device has a low viewing angle characteristic due to the liquid crystal molecules being driven by the vertically formed electric field.

Therefore, to overcome the drawback, a new technology such as a liquid crystal driving method by fringe field switching (FFS) has been proposed. The liquid crystal driving method using the FFS exhibits a high viewing angle characteristic.

Hereinafter, the related art FFS mode LCD device having the advantage will be described with reference to FIGS. 1 and 2.

FIG. 1 is a schematic planar view of an FFS mode LCD device according to the related art.

FIG. 2 is a sectional view taken along the lines IIa-IIa and IIb-IIb of FIG. 2, which schematically illustrates the array substrate for the related art FFS mode LCD device;

An array substrate 10 for an FFS mode LCD device according to the related art, as illustrated in FIGS. 1 and 2, may include a plurality of gate lines 14 extending in one direction on a transparent insulating substrate 11 and spaced from one another in parallel, a plurality of data lines 23 intersecting with the gate lines 14 to define pixel regions on the intersections, and a thin film transistor (T) disposed on each intersection between the gate lines 14 and the data lines 23 and including a gate electrode 13, an active layer 17, a source electrode 23a and a drain electrode 23b.

A large transparent pixel electrode 29 may be disposed on an entire surface of each pixel region of the insulating substrate 11, with a space apart from the gate line 14 and the data line 23. A plurality of transparent common electrodes 35 in a shape of bar may be disposed on the pixel electrode 29 with a planarization film 31 interposed therebetween.

The pixel electrode 29 may be electrically connected to the drain electrode 23b.

In addition, a gate pad 13a and a data pad 13b may extend from ends of the gate line 14 and the data line 23, respectively. The gate pad 13a and the data pad 13b may be connected to a gate pad connection pattern 35a and a data pad connection pattern 35b, respectively.

With the configuration, when a data signal is applied to the pixel electrode 29 via the TFT T, a fringe field may be formed between the common electrodes 35, to which a common voltage is applied, and the pixel electrode 29. Accordingly, liquid crystal molecules, which are arranged horizontally between the insulating substrate 11 and a color filter substrate (not shown) bonded to the insulating substrate 11, may be rotated by dielectric anisotropy. A rotation angle of the liquid crystal molecules may vary light transmittance through the pixel region. This may result in realizing gradation.

Hereinafter, description will be schematically given of masking processes, which are employed upon fabricating the array substrate for the related art FFS mode LCD device, with reference to FIG. 3.

FIG. 3 is a flowchart illustrating masking processes used upon fabricating the array substrate for the related art FFS mode LCD device.

As illustrated in FIG. 3, a process of fabricating the array substrate for the related art FFS mode LCD device may include a first masking process 51 of forming a gate line 14, a gate electrode 13, a gate pad 13a and a data pad 13b on an insulating substrate 11, a second masking process 52 of forming an active layer 17 on the gate electrode 13, a third masking process 53 of forming a source electrode 23a and a drain electrode 23b, which are spaced apart from each other, and the data line 23 on the active layer 17, a fourth masking process 54 of forming a drain contact hole (not shown) for exposing the drain electrode 23b, a fifth masking process 55 of forming a large pixel electrode 29, which is electrically connected to the drain electrode 23b through the drain contact hole, a sixth masking process 56 of forming a gate pad contact hole (not shown) and a data pad contact hole (not shown) for exposing the gate pad 13a and the data pad 13b, respectively, and a seventh masking process of forming common electrodes 35 corresponding to the pixel electrode 29, a gate pad connection pattern 35a and a data pad connection pattern 35b.

On the other hand, hereinafter, description will be schematically given of a method of fabricating the array substrate for the related art FFS mode LCD device, which is fabricated through those seven-time masking processes, with reference to FIGS. 4A to 4G.

FIGS. 4A to 4G are sectional views illustrating fabricating processes of the array substrate for the related art FFS mode LCD device.

As illustrated in FIG. 4A, a plurality of pixel regions including a switching area may be defined on a transparent insulating substrate 11. A first conductive metal layer (not shown) may be deposited on a transparent insulating substrate 11 in a sputtering manner. The first conductive metal layer (not shown) may be patterned through a first masking process (not shown; see reference numeral 51 in FIG. 3) using photolithography, thereby forming a gate line (not shown; see reference numeral 14 of FIG. 1), a gate electrode 13a, which protrudes from the gate line 14, and a gate pad 13a and a data pad 13b electrically connected to an external driving circuit.

Referring to FIG. 4B, after depositing a gate insulating layer 15 on the entire surface of the substrate 11 including the gate electrode 13, an amorphous silicon layer (a-Si:H) (not shown) and an amorphous silicon layer (n+ or p+) (not shown) which contains impurities may be deposited on the gate insulating layer 15 in a sequential manner.

Afterwards, although not shown, the amorphous silicon layer (n+ or p+) containing the impurities and the amorphous silicon layer (a-Si:H) may be patterned through a second masking process (not shown; see reference numeral 52 of FIG. 3) using photolithography, thereby forming an active layer 17 and an Ohmic contact layer (not shown).

Referring to FIG. 4C, a second conductive metal layer (not shown) may then be deposited on the entire insulating substrate 11 including the active layer 17 and the Ohmic contact layer (not shown). The second conductive metal layer may be selectively patterned through a third masking process (not shown; see the reference numeral 53 of FIG. 3) using photolithography, forming a data line 23 perpendicularly intersecting with the gate line 13, and a source electrode 23a and a drain electrode 23b extending from the data line 23.

Referring to FIG. 4D, after depositing a passivation layer 25 on the entire substrate 11 including the data line 23, the passivation layer 25 may be selectively patterned through a fourth masking process (not shown; see the reference numeral 54 of FIG. 3) using photolithography, forming a drain contact hole 27 for exposing the drain electrode 23b, and a gate pad contact hole 27a and a data pad contact hole 27b for exposing the gate pad 13a and the data pad 13b, respectively.

Referring to FIG. 4E, after forming a first transparent conductive layer (not shown) on the passivation layer 25, which includes the drain contact hole 27a exposing the drain electrode 23b, the gate pad contact hole 27a and the data pad contact hole 27b exposing the gate pad 13a and the data pad 13b, the first transparent conductive layer (not shown) may be selectively patterned through a fifth masking process (not shown; see the reference numeral 55 of FIG. 3) using photolithography, forming a large pixel electrode 29 which is electrically connected to the drain electrode 23b.

Referring to FIG. 4F, after forming a planarization layer 31 on the entire surface of the insulating substrate 11 including the pixel electrode 29, the planarization layer 31 may be patterned through a sixth masking process (not shown; see the reference numeral 56 of FIG. 3) using photolithography, forming a gate pad opening 33a and a data pad opening 33b for exposing the gate pad 13a and the data pad 13b, respectively.

Referring to FIG. 4G, after forming a second transparent conductive layer (not shown) on the planarization layer 31, which includes the gate pad opening 33a and the data pad opening 33b, the second transparent conductive layer may be selectively patterned through a seventh masking process (not shown; see the reference numeral 57 of FIG. 3) using photolithography, and forming both a plurality of diverged common electrodes 35 corresponding to the pixel electrode 29, and a gate pad connection pattern 35a and a data pad connection pattern 35b electrically connected to the gate pad 13a and the data pad 13b. Accordingly, the fabrication of the array substrate for the related art FFS mode LCD device may be completed.

Afterwards, although not shown, a color filter array substrate fabricating process and a process of forming a liquid crystal layer between the array substrate and the color filter substrate may be executed, to completely fabricate the FFS mode LCD device.

However, according to the array substrate for the FFS mode LCD device and the fabricating method thereof according to the related art, the process of forming the source electrode and the drain electrode and the process of forming the pixel electrode are separately carried out while fabricating the array substrate for the FFS mode LCD device. This may require the totally seven masking processes. Consequently, the fabricating process may become complicated and the fabricating cost may increase accordingly.

Also, according to the array substrate for the FFS mode LCD device and the fabricating method thereof according to the related art, when a structure with a common electrode on the uppermost layer is applied for low voltage driving, capacitance Cdp may change due to an overlay difference between the pixel electrode and the data line, thereby causing an even/odd defect. Especially, the even/odd defect due to the overlapping of the data line and the pixel electrode may make it difficult to apply the common electrode Vcom to the uppermost layer Top in a low power driving type.

According to the array substrate for the FFS mode LCD device and the fabricating method thereof according to the related art, since the drain contact hole has to be separately formed to electrically connect the drain electrode to the pixel electrode, an area for forming the drain contact hole is required, which may arouse a reduction of transmittance and an aperture ratio. Specifically, the requirement of the drain contact hole for forming the drain electrode and the pixel electrode may reduce an aperture plane (aperture area) that much. Also, a black matrix may further be needed to cover such drain contact hole formation area, which may result in a further reduction of the aperture plane.

Furthermore, according to the array substrate for the FFS mode LCD device and the fabricating method thereof according to the related art, since the planarization layer is formed on the entire surface of the insulating substrate, the transmittance of an opening may further be reduced.

SUMMARY OF THE DISCLOSURE

Therefore, to obviate the drawbacks of the related art, an aspect of the detailed description is to provide an array substrate for a fringe field switching (FFS) mode liquid crystal display (LCD) device, capable of maximizing transmittance by removing (omitting) a drain contact hole structure in such a manner of simultaneously forming a pixel electrode and a drain electrode to allow for applying Z-inversion and a structure of forming a common electrode on the uppermost layer while fabricating the FFS mode LCD device, and a fabricating method thereof.

To achieve these and other advantages and in accordance with the purpose of this specification, as embodied and broadly described herein, there is provided an array substrate for a fringe field switching (FFS) mode liquid crystal display (LCD) device, the array substrate including a gate line formed on one surface of an insulating substrate in one direction, an active layer formed on a gate electrode extending from the gate line, a data line having a source electrode formed on one side of the active layer, the data line defining a pixel region by intersecting with the gate line, a large pixel electrode formed on another side of the active layer, spaced from the source electrode, and on the pixel region of the insulating substrate, a planarization layer formed on the data line and the source electrode, a passivation layer formed on an entire surface of the insulating substrate having the planarization layer, and a common electrode formed on the passivation layer, and overlapping the pixel electrode and the data line.

To achieve these and other advantages and in accordance with the purpose of this specification, as embodied and broadly described herein, there is provided a method for fabricating an array substrate for a fringe field switching mode liquid crystal display device, the method including forming a gate line, a gate pad and a data pad on one surface of an insulating substrate in one direction, forming an active layer on a gate electrode extending from the gate line, forming a data line defining a pixel region by intersecting with the gate line, the data line having a source electrode disposed on one side of the active layer, forming a large pixel electrode on another side of the active layer, spaced from the source electrode, and on the pixel region of the insulating substrate, forming a planarization layer on the data line and the source electrode, forming a passivation layer on an entire surface of the insulating substrate having the planarization layer, forming a gate pad contact hole and a data pad contact hole on the passivation layer, the gate pad contact hole and the data pad contact hole exposing the gate pad and the data pad, respectively, and forming a common electrode on the passivation layer, the common electrode overlapping the pixel electrode and the data line.

According to an array substrate for an FFS mode LCD device and a fabricating method thereof according to the present disclosure, an aperture ratio and transmittance can be maximized by removing (omitting) a drain contact hole structure in such a manner of simultaneously forming a pixel electrode and a drain electrode to allow for applying a structure with a common electrode on the uppermost layer while fabricating the FFS mode LCD device.

According to an array substrate for an FFS mode LCD device and a fabricating method thereof according to the present disclosure, a data line including a source electrode and a pixel electrode may be simultaneously formed and thus the number of masks may be reduced that much. Also, since there is no overlay margin by virtue of a self alignment between the source electrode and the pixel electrode, an even/odd defect may not be caused.

In addition, according to an array substrate for an FFS mode LCD device and a fabricating method thereof according to the present disclosure, a planarization layer may be present only on a data line, other than on an entire surface of an insulating substrate, which may result in an increase in transmittance of an opening that much.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of an array substrate structure for an FFS mode LCD device according to the exemplary embodiments, with reference to the accompanying drawings.

Figure 1:
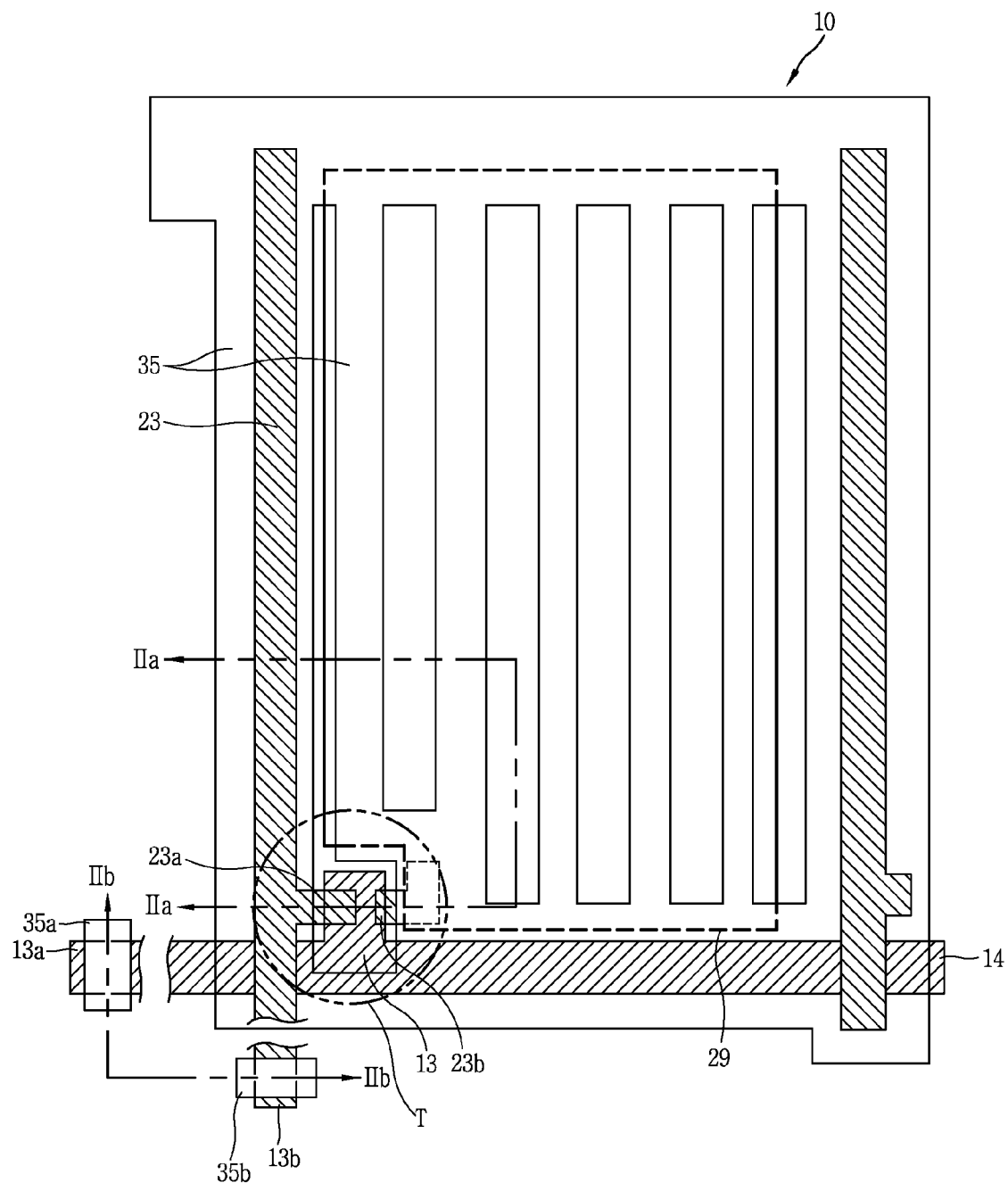
FIG. 1 is a planar view schematically illustrating an array substrate for an FFS mode LCD device according to the related art.
Figure 2:
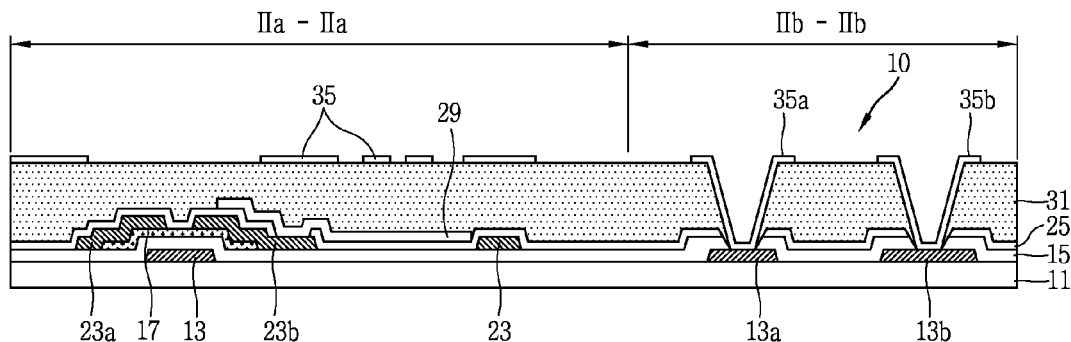
FIG. 2 is a sectional view taken along the lines IIa-IIa and IIb-IIb of FIG. 2, which schematically illustrates the array substrate for the related art FFS mode LCD device.
Figure 3:
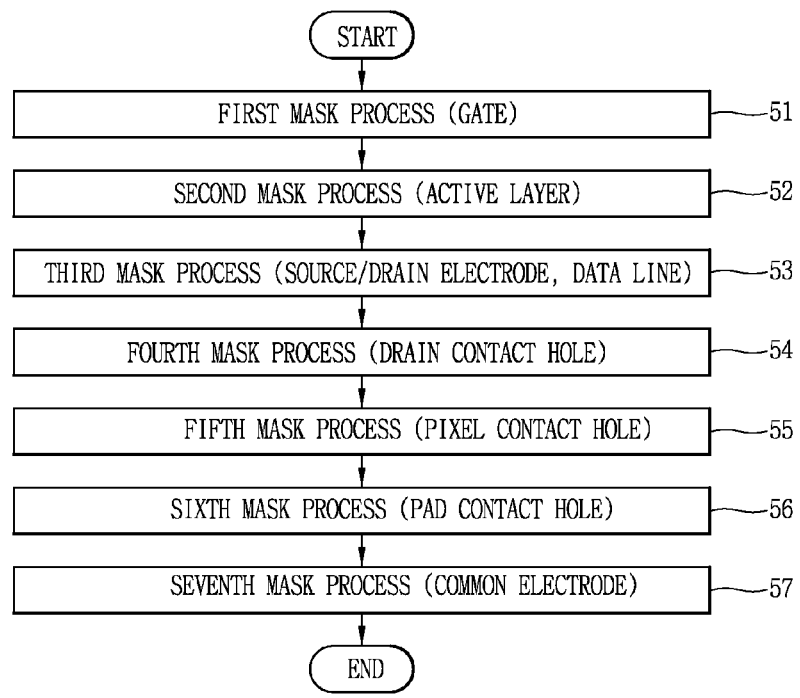
FIG. 3 is a flowchart illustrating masking processes used upon fabricating the array substrate for the related art FFS mode LCD device.
Figure 4A:
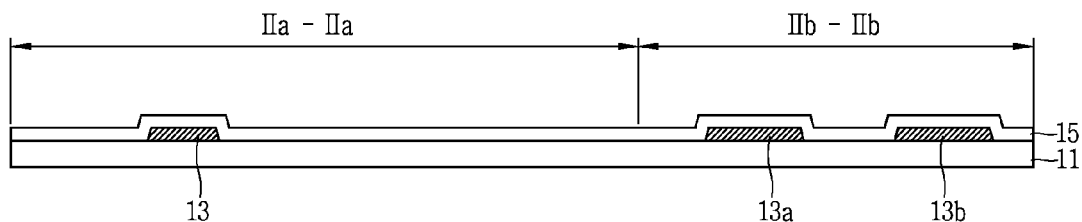
FIGS. 4A to 4G are sectional views illustrating fabricating processes of the array substrate for the related art FFS mode LCD device.
Figure 4B:
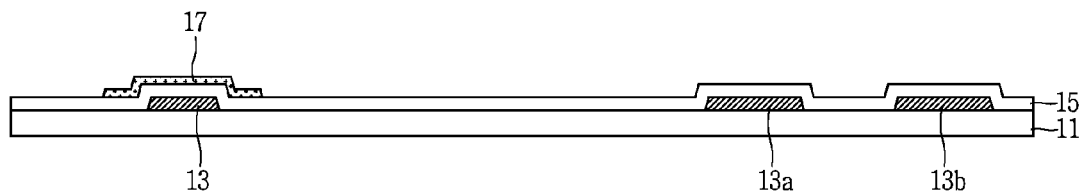
Figure 4C:
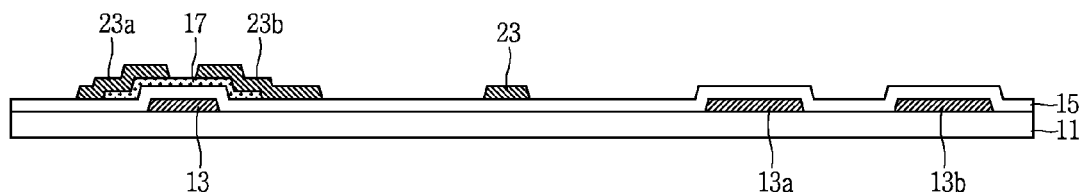
Figure 4D:
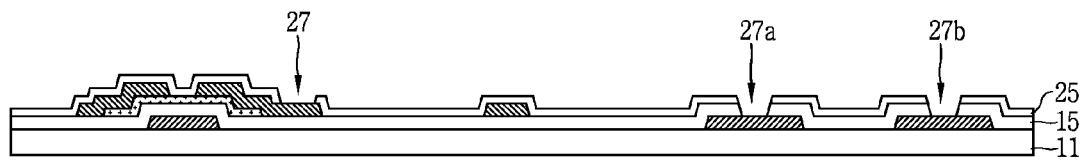
Figure 4E:
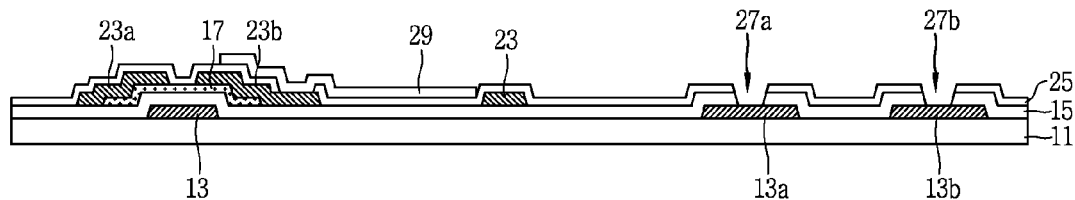
Figure 4F:
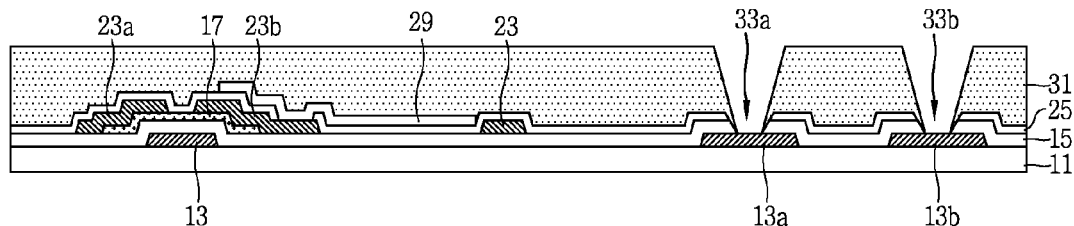
Figure 4G:
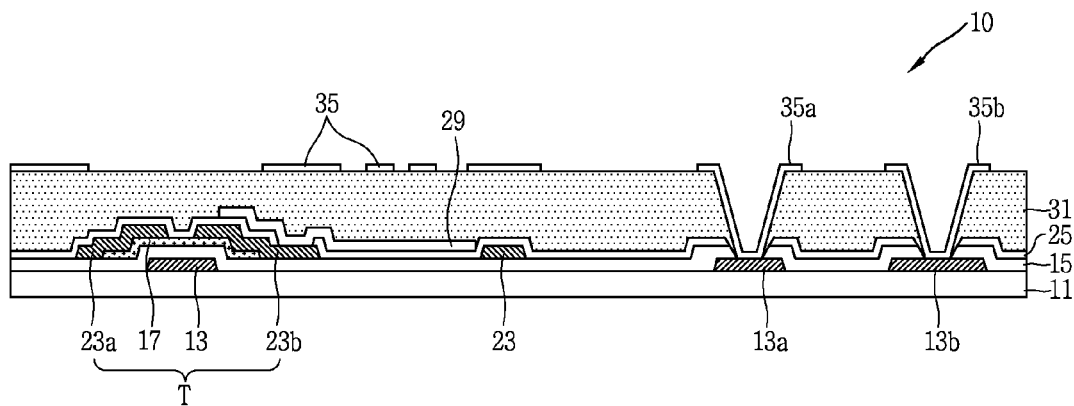
Figure 5:
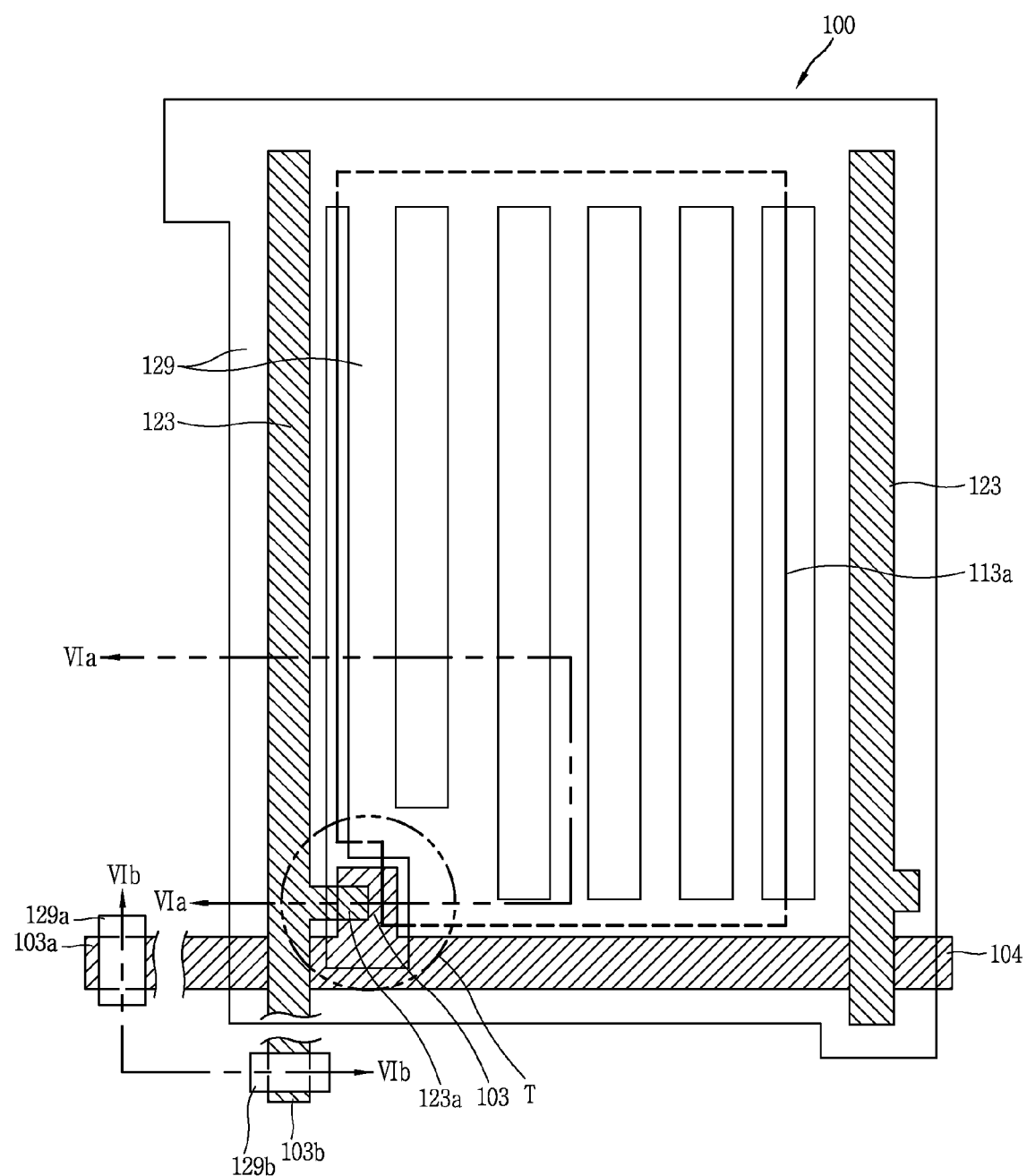
FIG. 5 is a planar view schematically illustrating an array substrate for FFS mode LCD device according to the present disclosure.
Figure 6:
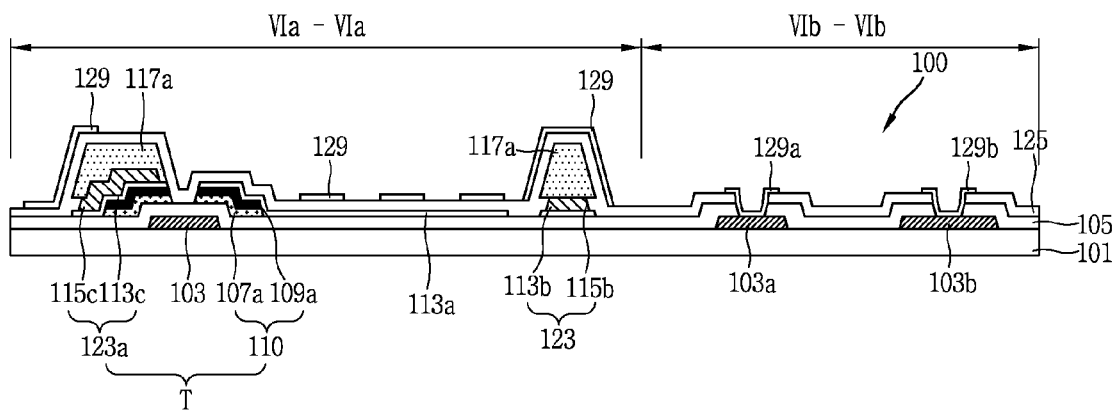
FIG. 6 is a sectional view taken along the lines VIa-VIa and VIb-VIb of FIG. 5, which schematically illustrates the array substrate for the FFS mode LCD device according to the present disclosure.

FIG. 5 is a planar view schematically illustrating an array substrate for FFS mode LCD device according to the present disclosure, and FIG. 6 is a sectional view taken along the lines VIa-VIa and VIb-VIb of FIG. 5, which schematically illustrates the array substrate for the FFS mode LCD device according to the present disclosure.

An array substrate 100 for an FFS mode LCD device according to the present disclosure, as illustrated in FIGS. 5 and 6, may include gate lines 104 formed on one surface of an insulating substrate 101 in one direction, an active layer 110 formed on a gate electrode 103 extending from the gate line 104, a data line 123 forming a pixel region by intersecting with the gate line 104 and having a source electrode 123a formed on one side of the active layer 110, a large pixel electrode 113a formed on another side of the active layer 110, which is spaced from the source electrode 123a, and on the pixel region of the insulating substrate 101, which is formed by the gate lines 104 and the data lines 123 intersecting with each other, a planarization layer pattern 117a formed on the data line 123 and the source electrode 123a, a passivation layer 125 formed on the entire surface of the insulating substrate 101 including the planarization layer pattern 117a, and a common electrode 129 formed on the passivation layer 125 and overlapping the pixel electrode 113a and the data line 123.

Here, a thin film transistor T may be configured by including the gate electrode 103 perpendicularly extending from the gate line 104 formed on the insulating substrate 101, a gate insulating layer 105 formed on the gate electrode 103, a semiconductor layer 107a, and a source electrode 123a and a pixel electrode 113a spaced from each other by a channel region of the active layer 110 implemented as an Ohmic contact pattern 109a. Here, the pixel electrode 113a may also serve as a drain electrode. That is, the present disclosure may use the pixel electrode 113a as the drain electrode without formation of the separate drain electrode.

The large transparent pixel electrode 113a may be disposed on the pixel region of the insulating substrate 101 which is defined by intersecting of the gate lines 104 and the data lines 123. Here, the pixel electrode 113a may have a single layer structure of a transparent conductive layer. The data line 123 may have a layered structure of a transparent conductive pattern 113b and a metal pattern 115b. The source electrode 123a may have a layered structure of a transparent conductive pattern 113c and a metal pattern 115c. Here, the source electrode 123a may extend from the data line 123.

The planarization layer pattern 117a may be formed only on the data line 123 and the source electrode 123a, and may not be present on a gate pad 103a and a data pad 103b including the pixel electrode 113a located on the pixel region of the insulating substrate 101. Hence, the planarization layer pattern 117a may not be formed on the entire surface of the insulating substrate 101 but be present only on the data line 123 including the source electrode 123a. This may result in an increase in transmittance of an opening.

The common electrode 129 may be diverged into a plurality. The plurality of diverged common electrodes 129 may overlap the pixel electrode 113a with the passivation layer 125 interposed therebetween. Here, the common electrode 129 may also overlap the data line 123.

Therefore, a reference voltage, namely, a common voltage for activating liquid crystal may be supplied to each pixel via the plurality of common electrodes 129. The common electrodes 129 may form a fringe field on each pixel region by overlapping the large pixel electrode 113a with the passivation layer 125 interposed therebetween.

Although not shown, a lower alignment layer (not shown) may be formed on the entire surface of the insulating substrate 101 including the common electrodes 129.

Although not shown, on a color filter substrate (not shown), which is bonded to a TFT substrate, namely, the insulating substrate 101 with spacing therebetween, a black matrix (not shown) for blocking light from being transmitted into a region except for the pixel region may be formed.

Red, green and blue color filter layers (not shown) may be formed on the pixel region of the color filter substrate. Here, the black matrix may be formed on the color filter substrate (not shown) between the red, green and blue color filter layers.

Here, upon bonding the color filter substrate to the insulating substrate 101, namely, the TFT substrate, the black matrix may be disposed to overlap a region except for the pixel region of the insulating substrate 101, for example, the TFT T, the gate line 104 and the data line 123. Here, the present disclosure may not separately form a drain contact hole because the pixel electrode 113a serves as the drain electrode. Hence, without forming the drain contact hole, the region covered with the black matrix can be reduced that much, which may result in maximization of an aperture ratio and transmittance.

Although not shown, an upper alignment layer (not shown) for allowing liquid crystal to be aligned in a preset direction may be formed on the color filter substrate (not shown).

Accordingly, when a data signal is applied to the pixel electrode 113a through the TFT T, a fringe field may be formed between the common electrode 129 to which a common voltage is applied and the pixel electrode 113a. In response to this, liquid crystal molecules which are horizontally arranged between the insulating substrate 101 and the color filter substrate (not shown) may be rotated by dielectric anisotropy. The rotation angle of the liquid crystal molecules may vary transmittance of light transmitted through the pixel region, thereby realizing gradation.

Consequently, according to the array substrate for the FFS mode LCD device according to the present disclosure, the aperture ratio and transmittance can be maximized by removing (omitting) a drain contact hole structure in such a manner of simultaneously forming the pixel electrode and the drain electrode to allow for applying a structure of forming a common electrode on the uppermost layer while fabricating the FFS mode LCD device.

Also, according to the array substrate for the FFS mode LCD device according to the present disclosure, the planarization layer may be formed only on the data line, other than formed on the entire surface of the insulating substrate, which may result in an increase in transmittance of an opening that much.

Hereinafter, description will be briefly given of masking processes used upon fabrication of an array substrate for an FFS mode LCD device according to the present disclosure having the configuration, with reference to FIG. 7.

Figure 7:
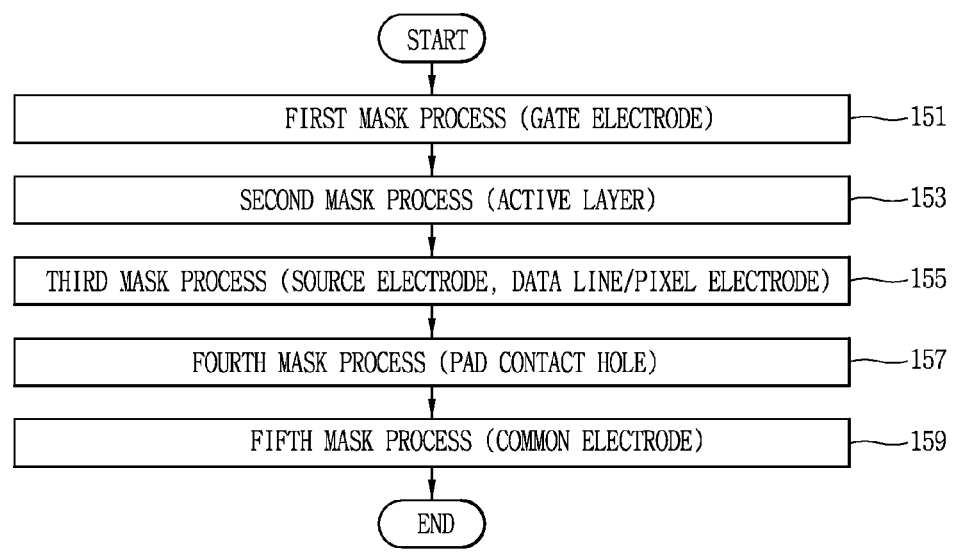
FIG. 7 is a flowchart illustrating masking processes used upon fabricating the array substrate for the FFS mode LCD device according to the present disclosure.

FIG. 7 is a flowchart illustrating masking processed used upon fabricating an array substrate for an FFS mode LCD device according to the present disclosure.

As illustrated in FIG. 7, masking processes used upon fabricating an array substrate for an FFS mode LCD device according to the present disclosure may include a first masking process 151 of forming a gate line 104, a gate electrode 103, a gate pad 103a and a data pad 103b on an insulating substrate 101, a second masking process 153 of forming an active layer 110 on the gate electrode 103, a third masking process 155 of forming both a data line 123 including a source electrode 123a on the active layer 110 and a large pixel electrode 113a, which is spaced from the source electrode 123a and located on a pixel region defined as the data line 123 and the gate line 104 intersect each other, a fourth masking process 157 of forming a gate pad contact hole (not shown; see a reference number 127a of FIG. 8J) and a data pad contact hole (not shown, see a reference numeral 127b of FIG. 8J) for exposing the gate pad 103a and the data pad 103b, and a fifth masking process 159 of forming a common electrode 129 corresponding to the pixel electrode 113a, a gate pad connection pattern 129a and a data pad connection pattern 129b.

Hereinafter, description will be given of a method of fabricating an array substrate for an FFS mode LCD device according to the present disclosure.

FIGS. 8A to 8J are sectional views illustrating fabricating processes of an array substrate for an FFS mode LCD device according to the present disclosure.

Figure 8A:
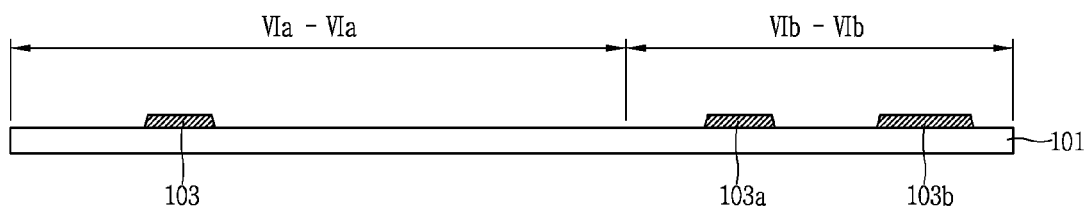
FIGS. 8A to 8J are sectional views illustrating fabricating processes of an array substrate for an FFS mode LCD device according to the present disclosure.

Referring to FIG. 8A, a plurality of pixel regions including a switching region may be defined on a transparent insulating substrate 101, and a first metal conductive layer (not shown) may be deposited on the insulating substrate 101 in a sputtering manner. Here, the first metal conductive layer may be made of a conductive metal selected from a group consisting of Aluminum (Al), Tungsten (W), Copper (Cu), Molybdenum (Mo), Chrome (Cr), Titanium (Ti), Molytungsten (MoW), Molytitanium (MoTi) and Copper/Molytungsten (Cu/MoTi).

Although not shown, a photoresist with high transmittance may be coated on the first metal conductive layer (not shown) to form a first photosensitive film (not shown).

The first photosensitive film (not shown) may then be patterned through a first masking process (see 151 of FIG. 6) using photolithography, forming a first photosensitive pattern (not shown).

Next, the first metal conductive layer may be selectively etched using the first photosensitive pattern as an etching mask, thereby forming a gate electrode 103, a gate pad 103a and a data pad 103b on the insulating substrate 101. Here, the gate electrode 103 may extend from the gate line 104.

Figure 8B:
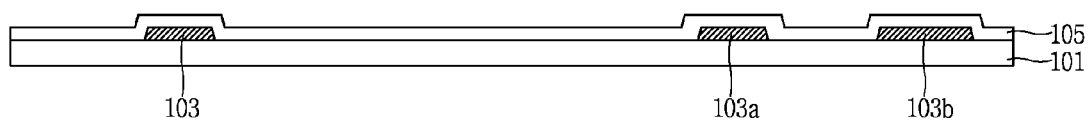

Afterwards, referring to FIG. 8B, the first photosensitive pattern may be removed. Then, a gate insulating layer 105 which is formed of silicon nitride (SiNx) or silicon oxide (SiO$_2$) may be formed on the entire surface of the insulating substrate 101 having the gate electrode 103.

Figure 8C:
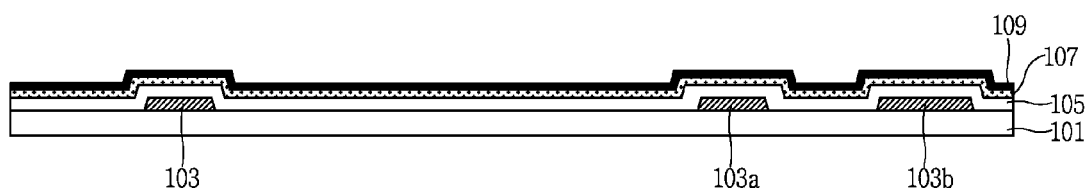

Referring to FIG. 8C, an amorphous silicon layer (a-Si:H) 107 and an Ohmic contact layer 109 may be sequentially deposited on the gate insulating layer 105. Here, the Ohmic contact layer 109 may be made by using Molytitanium (MoTi) or an amorphous silicon layer (n+ or p+) containing impurities. Hereinafter, description will be given of an example in which the Ohmic contact layer 109 is made of Molybdenum Titanium (MoTi).

Although not shown, a photoresist with high transmittance may be coated on the Ohmic contact layer 109 to form a second photosensitive film (not shown).

The second photosensitive film may then be patterned through a second masking process (see 153 of FIG. 6) using photolithography, thereby forming a second photosensitive pattern (not shown).

Figure 8D:
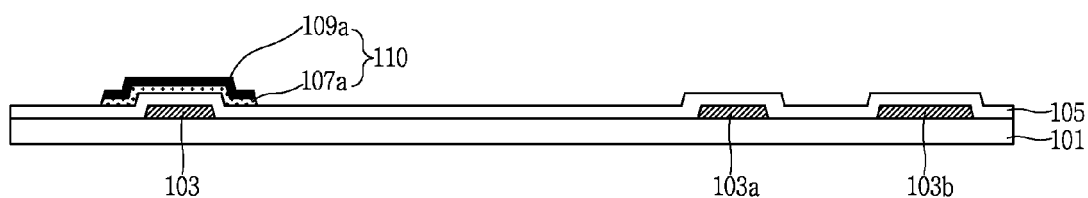

Referring to FIG. 8D, the amorphous silicon layer (a-Si:H) 107 and the Ohmic contact layer 109 may be selectively etched using the second photosensitive pattern as an etching mask, forming an active layer 110 which includes an amorphous silicon pattern 107a and an Ohmic contact pattern 109a.

Figure 8E:
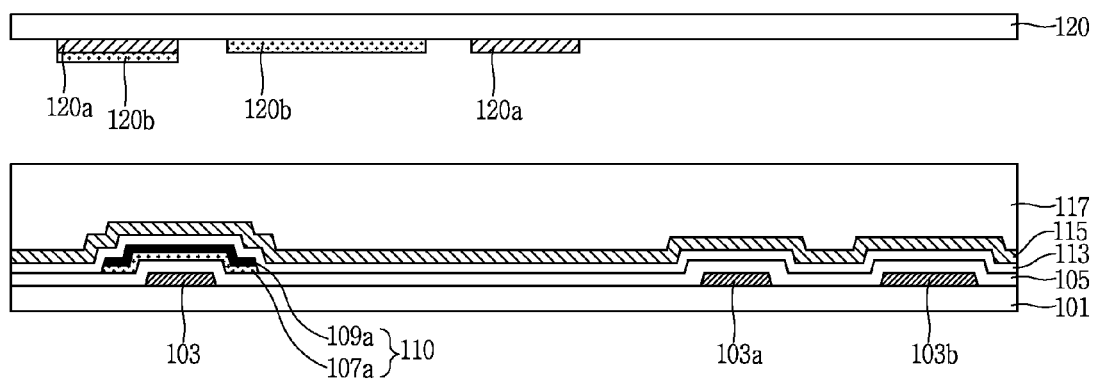

Referring to FIG. 8E, after the second photosensitive pattern is removed, a first transparent conductive layer 113 and a second metal conductive layer 115 may be sequentially deposited on the entire surface of the insulating substrate 101 having the active layer 110 in a sputtering manner. Here, the first transparent conductive layer 113 may be made of one selected from a group consisting of indium tin oxide (ITO) and indium zinc oxide (IZO). Also, the second metal conductive layer 115 may be made of one selected from a group consisting of Aluminum (Al), Tungsten (W), Copper (Cu), Molybdenum (Mo), Chrome (Cr), Titanium (Ti), Molytungsten (MoW), Molytitanium (MoTi) and Copper/Molytungsten (Cu/MoTi).

Afterwards, a planarization layer 117 having photosensitivity may be formed on the second metal conductive layer 115. The planarization layer 117 may be made of one selected from organic insulating materials with photosensitivity, such as photoacryl.

Next, an exposure process may be carried out by irradiating infrared rays onto the planarization layer 117 using a half-ton mask 120, which includes a light shielding pattern 120a and a semitransparent pattern 120b. Here, the light shielding pattern 120a of the half-ton mask 120 may be located on the planarization layer 117 which corresponds to a region for forming a data line including a source electrode. The semitransparent pattern 120b may be located on the planarization layer 117 which corresponds to a pixel electrode formation region. On the other hand, instead of the half-ton mask, a diffraction mask, such as a slit mask or other types of diffraction mask, which use a diffraction effect of light, may also be used.

Figure 8F:
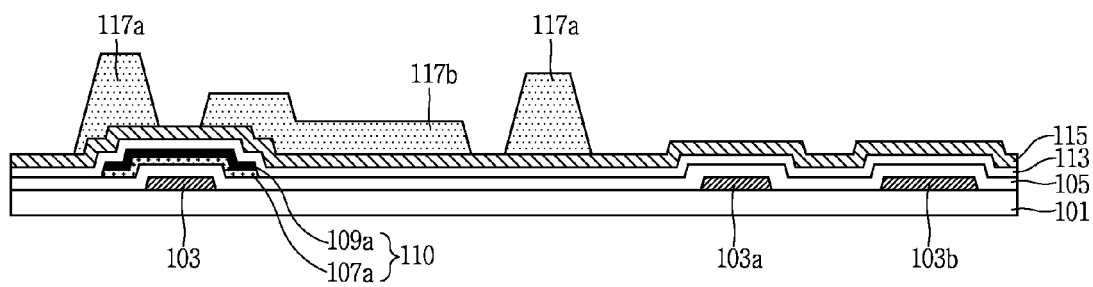

Referring to FIG. 8F, after the exposure process, a development process may be carried out to selectively remove the planarization layer 117, so as to form a planarization pattern 117a corresponding to the formation region for the data line including the source electrode and a dummy planarization pattern 117b corresponding to the pixel electrode formation region. Here, since the planarization pattern 117a shields light, its thickness may remain still. However, the dummy planarization pattern 117b may be removed by a predetermined thickness due to light being transmitted therethrough. That is, the dummy planarization pattern 117b may be thinner than the planarization pattern 117a.

Figure 8G:
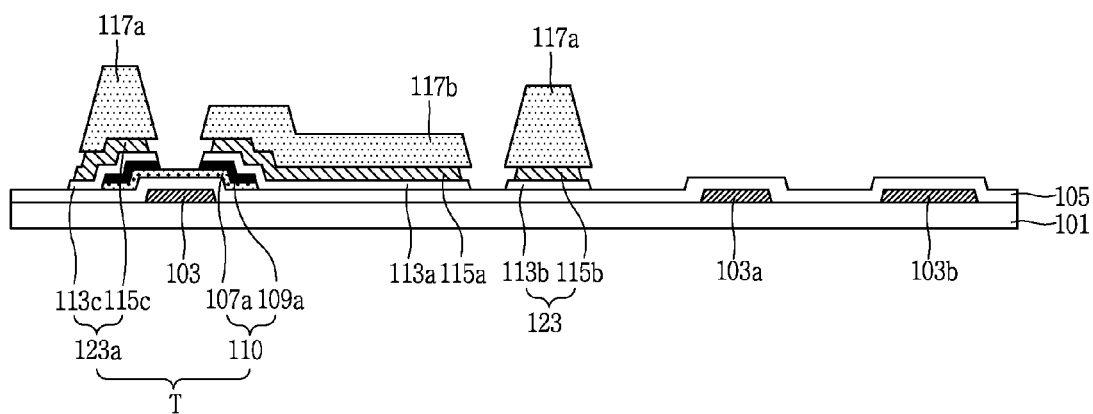

Referring to FIG. 8G, the second metal conductive layer 115 and the first transparent conductive layer 113 may be selectively etched using the planarization pattern 117a and the dummy planarization pattern 117b as etching masks, so as to form a data line 123 and a source electrode 123a extending from the data line 123 beneath the planarization pattern 117a. Here, the source electrode 123a and the data line 123 may have a layered structure of a first transparent conductive layer patterns 113b, 113c and a second metal conductive layer pattern 115b, 115c. Also, the planarization pattern 117a may be formed only on the data line 123 including the source electrode 123a.

Figure 8H:
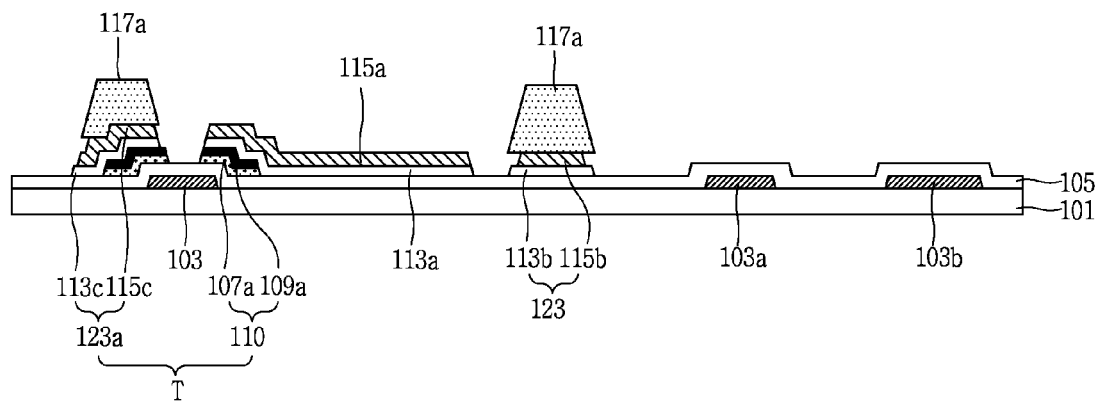

Referring to FIG. 8H, after curing the planarization pattern 117a and the dummy planarization pattern 117b, an ashing process may be carried out to fully remove the dummy planarization pattern 117b, thereby exposing the lower dummy metal conductive pattern 113a. Here, a part of the planarization pattern 117a may also be removed in a thickness direction.

Figure 8I:
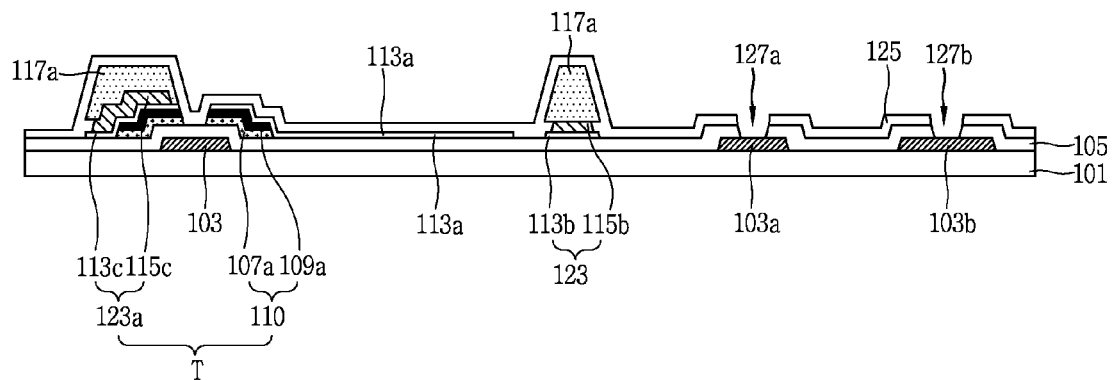

Referring to FIG. 8I, the exposed dummy metal conductive pattern 113a may be removed through a wet etching process, thereby forming a large pixel electrode 113a on the pixel region of the insulating substrate 101. Here, the pixel electrode 113a may be disposed on the pixel region which is defined as the data lines 123 and the gate lines 104 intersect with each other.

Figure 8J:
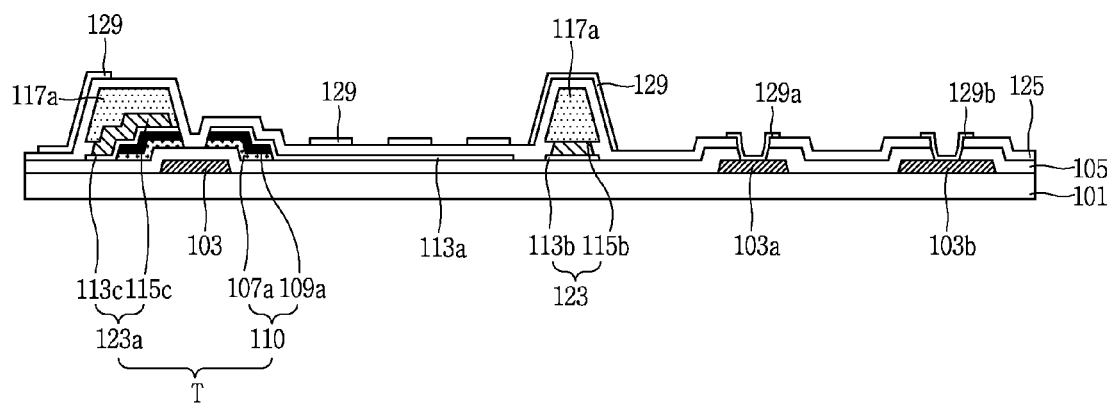

Referring to FIG. 8J, an inorganic insulating material or an organic insulating material may be deposited on the entire surface of the insulating substrate 101 having the pixel electrode 113a, thereby forming a passivation layer 125. A photoresist with high transmittance may then be coated on the passivation layer 125 to form a third photosensitive film (not shown).

Although not shown, exposure and development processes may be carried out through a fourth masking process (see 157 of FIG. 6) using photolithography, to remove the third photosensitive film (not shown), thereby forming a third photosensitive pattern (not shown).

Next, the passivation layer 125 and the lower gate insulating layer 105 may be selectively etched by using the third photosensitive pattern as an etching mask, forming a gate pad contact hole 127a for exposing the gate pad 103a and a data pad contact hole 127b for exposing the data pad 103b.

Afterwards, the third photosensitive pattern may be removed, and a second transparent conductive layer (not shown) may be deposited on the entire surface of the insulating substrate 101 having the gate pad contact hole 127a and the data pad contact hole 127b in a DC magnetron sputtering manner. Here, the second transparent conductive layer may be made of one of transparent materials including ITO and IZO.

A photoresist with high transmittance may be coated on the second transparent conductive layer, to form a fourth photosensitive film (not shown).

The exposure and development processes may be carried out through a fifth masking process (see 159 of FIG. 6) using photolithography, to remove the fourth photosensitive film, thereby forming a fourth photosensitive pattern (not shown).

Still referring to FIG. 8J, the second transparent conductive layer may be etched using the fourth photosensitive pattern as an etching mask, thereby simultaneously forming both a plurality of common electrodes 129, which are diverged with spacing from one another, and a gate pad connection pattern 129a and a data pad connection pattern 129b, which are electrically connected to the gate pad 103a and the data pad 103b through the gate pad contact hole 127a and the data pad contact hole 127b, respectively.

Although not shown, the fourth photosensitive pattern may then be removed, and a lower alignment layer (not shown) may be formed on the entire substrate including the plurality of common electrodes 129, thereby completing the fabricating process of the array substrate for the FFS mode LCD device according to the present disclosure.

On the other hand, although not shown, a black matrix (not shown) for shielding light transmission may be formed on a region except for the pixel region on a color filter substrate (not shown), which is bonded to the insulating substrate 101 with spacing therebetween.

Red, green and blue color filter layers (not shown) may be formed on the pixel region of the color filter substrate. Here, the black matrix may be formed on the color filter substrate (not shown) between the red, green and blue color filter layers.

Here, upon bonding the color filter substrate to the insulating substrate 101, namely, the TFT substrate, the black matrix may be disposed to overlap a region except for the pixel region of the insulating substrate 101, for example, overlap the TFT T, the gate line 104 and the data line 123. Here, the present disclosure may not separately form a drain contact hole because the pixel electrode 113a serves as the drain electrode.

Hence, without forming the drain contact hole, the region covered with the black matrix can be reduced that much, which may result in maximization of an aperture ratio and transmittance.

Afterwards, although not shown, an upper alignment layer (not shown) for allowing liquid crystal to be aligned in a preset direction may be formed on the color filter array substrate (not shown).

Although not shown, a liquid crystal layer (not shown) may be formed between the insulating substrate 101 and the color filter substrate, thereby completely fabricating the FFS mode LCD device.

Therefore, according to the array substrate for the FFS mode LCD device and the fabricating method thereof according to the present disclosure, an aperture ratio and transmittance can be maximized by removing (omitting) a drain contact hole structure in such a manner of simultaneously forming the pixel electrode and the drain electrode to allow for applying a structure with the common electrode on the uppermost layer while fabricating the FFS mode LCD device.

According to the array substrate for the FFS mode LCD device and the fabricating method thereof according to the present disclosure, the data line including the source electrode and the pixel electrode may be simultaneously formed and thus the number of masks may be reduced that much. Also, since there is no overlay margin by virtue of a self alignment between the source electrode and the pixel electrode, an even/odd defect may not be caused.

In addition, according to the array substrate for the FFS mode LCD device and the fabricating method thereof according to the present disclosure, the planarization layer may be present only on the data line, other than on the entire surface of the insulating substrate, which may result in an increase in transmittance of an opening that much.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An array substrate for a fringe field switching mode liquid crystal display device, the array substrate comprising:
    a gate line formed on one surface of an insulating substrate in one direction;
    an active layer formed on a gate electrode extending from the gate line;
    a data line having a source electrode formed on one side of the active layer, the data line defining a pixel region by intersecting with the gate line;
    a large pixel electrode formed on another side of the active layer, spaced from the source electrode, and on the pixel region of the insulating substrate;
    a planarization layer formed only on the data line and the source electrode;
    a passivation layer formed on an entire surface of the insulating substrate having the planarization layer; and
    a common electrode formed on the passivation layer, and overlapping the pixel electrode and the data line.

2. The array substrate of claim 1, wherein the pixel electrode comprises a drain electrode.

3. The array substrate of claim 1, wherein the planarization layer is formed of an organic insulating material with photosensitivity.

4. The array substrate of claim 1, wherein the source electrode and the data line have a layered structure of a transparent conductive pattern and a metal conductive pattern.

5. A method for fabricating an array substrate for a fringe field switching mode liquid crystal display device, the method comprising:
    forming a gate line, a gate pad and a data pad on one surface of an insulating substrate in one direction;
    forming an active layer on a gate electrode extending from the gate line;
    forming a data line defining a pixel region by intersecting with the gate line, the data line having a source electrode disposed on one side of the active layer;
    forming a large pixel electrode on another side of the active layer, spaced from the source electrode, and on the pixel region of the insulating substrate;
    forming a planarization layer only on the data line and the source electrode;
    forming a passivation layer on an entire surface of the insulating substrate having the planarization layer;
    forming a gate pad contact hole and a data pad contact hole on the passivation layer, the gate pad contact hole and the data pad contact hole exposing the gate pad and the data pad, respectively; and
    forming a common electrode on the passivation layer, the common electrode overlapping the pixel electrode and the data line.

6. The method of claim 5, wherein the pixel electrode is used as a drain electrode.

7. The method of claim 5, wherein the planarization layer is formed of an organic insulating material with photosensitivity.

8. The method of claim 5, wherein the source electrode and the data line have a layered structure of a transparent conductive pattern and a metal conductive pattern.

9. The method of claim 5, wherein the step of forming the data line and the step of forming the large pixel electrode are executed through a single masking process.

* * * * *